Jan. 2, 1968     G. W. MORK ET AL     3,362,022

SAFE LOAD WARNING SYSTEM

Filed April 22, 1965     5 Sheets-Sheet 1

INVENTORS
GEORGE W. MORK
HERMAN G. PETERS

BY

*Thomas W. Ehrmann*

ATTORNEY

Jan. 2, 1968   G. W. MORK ET AL   3,362,022
SAFE LOAD WARNING SYSTEM
Filed April 22, 1965   5 Sheets-Sheet 2

INVENTORS
GEORGE W. MORK
HERMAN G. PETERS

BY *Thomas W. Ehrmann*

ATTORNEY

INVENTORS
GEORGE W. MORK
HERMAN G. PETERS

BY
*Thomas W. Ehrmann*

ATTORNEY

INVENTORS
GEORGE W. MORK
HERMAN G. PETERS

BY

Thomas W. Ehrmann

ATTORNEY

Fig. 9

INVENTORS
GEORGE W. MORK
HERMAN G. PETERS
BY
Thomas W. Ehrmann
ATTORNEY

United States Patent Office 3,362,022
Patented Jan. 2, 1968

3,362,022
SAFE LOAD WARNING SYSTEM
George W. Mork, South Milwaukee, and Herman G. Peters, New Berlin, Wis., assignors to Bucyrus-Erie Company, South Milwaukee, Wis., a corporation of Delaware
Filed Apr. 22, 1965, Ser. No. 450,015
16 Claims. (Cl. 340—267)

This invention relates to a safe load warning system for boom equipped hoisting apparatus, and particularly to a safe load warning system that includes a curve plotted on a graph board of dissimilar electrically conducting properties and which curve represents combinations of load hoisted by the hoisting apparatus and angular position of the boom of such apparatus that will tend to overturn the apparatus, together with electrode means movable over the graph board to positions representative of the hoisted load and boom angle and which will actuate a warning signal when the electrode contacts the curve to alert the operator of the apparatus of impending dangerous load conditions.

There is an ever-present danger in the operation of boom equipped hoisting apparatus, such as cranes, that the conditions of lifting will be such as to cause the hoisting apparatus to overturn. This of course represents a danger to the operator of the apparatus and to the workmen operating in and about the apparatus. Overturning can also result in considerable property damage. Therefore, it is most desirable to provide means to aid the operator in determining the presence of dangerous loading conditions.

The conditions which would cause the equipment to overturn are not solely a function of the weight of the load being hoisted. Rather, overturning will generally result when the moment produced by the weight of the apparatus about a tipping point is exceeded by the magnitude of an overturning moment that is a product of the hoisted load and the moment arm of the hoisted load about the tipping point. This latter function can be expressed in terms of the angular position of the boom for the structural dimensions (i.e. the geometry) of a particular hoisting apparatus.

Numerous attempts have been made heretofore to devise systems for warning the operator when the hoisting conditions are such as to give rise to danger of overturning the equipment. Such systems range from very simple methods, such as measuring the boom angle and requiring the operator to compare the boom angle to a chart of permitted lifts for such boom angle, to more involved systems in which both the boom angle and the hoisted load are measured and an audible or visual signal is given to the operator when the conditions approach the overturning point.

However, none of the systems heretofore proposed has proven to be wholly effective or has obtained widespread use either because it requires the cooperation of the operator, is not sufficiently accurate or reliable, or must be calibrated for each individual piece of hoisting equipment to which it is applied.

It is a principal object of this invention to provide an improved safe load warning system for boom equipped hoisting apparatus that is accurate and reliable, that functions without assistance of the operator of the apparatus, and that can be applied without change to all similar pieces of hoisting apparatus of a particular type and size.

It is a further object of this invention to provide such a safe load warning system in which the geometry of a particular type and size of hoisting apparatus is considered in developing a curve from which overturning moment can be determined solely as a function of the two variables of hoisted load and boom angle.

It is another object of this invention to provide such a safe load warning system in which said curve is formed on a graph board with one of said curve and graph board being dielectric and the other electrically conductive, and in which an electrode moves over the graph board to positions representing hoisted load and boom angle to actuate a warning signal when the electrode contacts the curve.

It is also an object of this invention to provide such a safe load warning system in which a separate graph board with curve is provided for each boom length of a particular type and size of hoisting equipment whereby graph boards may be substituted in the system as the length of the boom is increased or decreased.

It is still a further object of this invention to provide a safe load warning system for boom equipped hoisting apparatus that will give distinctive warnings to the operator of the apparatus as different percentages of the overturning limit of the apparatus are reached.

It is yet another object of this invention to provide a safe load warning system in which the electrode moves over the graph board in response to signals proportional to the boom suspension load and the boom angle.

It is also an object of this invention to provide such a safe load warning system which measures the boom suspension load at the midpoint of plural part suspension tackle to thereby eliminate the effects of raising and lowering of the load and to obtain a true indication of the hoisted load.

The foregoing and other objects and advantages of this invention will appear in the description which follows. In the description reference is made to the accompanying drawings which form a part hereof and in which there is shown a preferred embodiment of the invention. This embodiment will be described in sufficient detail to enable those skilled in the art to practice the invention. However, it should be realized that changes can be made in the form, structure, and arrangement of the components of this invention without departing from the true scope of the invention. Accordingly, the description should not be taken in a limiting sense.

Figures 1, 4:
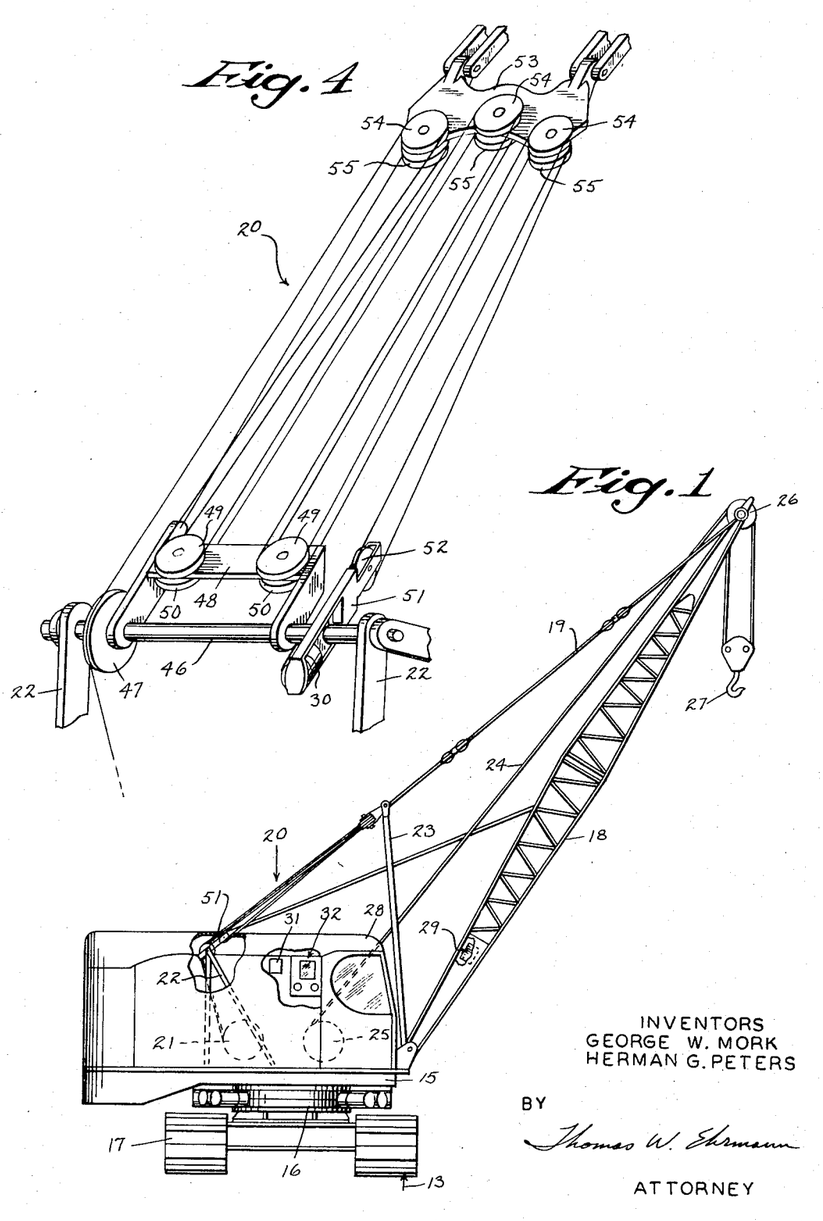
FIG. 1 is a side view in elevation of a crawler mounted crane to which the safe load warning system of this invention may be applied, and illustrating the location of components of the system.
FIG. 4 is a view in perspective of a suspension cable tackle showing the arrangement of an apparatus for indicating boom suspension load.

Referring now to the drawings, and particularly to FIG. 1, the system of this invention will be described as being applied to a crawler mounted crane which generally includes an equipment platform 15 mounted to revolve on a roller path 16 supported on a crawler 17. A boom 18, pivoted at its lower end to the equipment platform 15, is held at selected elevated positions by a suspension cable 19 connected to a suspension tackle designated generally by the numeral 20, with the free end of the suspension tackle cable being drawn about a driven suspension cable drum 21. The suspension tackle 20 is supported at one end on an A-frame 22 and at the other end by a mast 23, also pivotally connected to the machinery platform 15. A hoist cable 24 is drawn about a driven hoist cable drum 25 on the equipment platform 15 and travels about boom point sheaves 26 to carry a hook 27 for attachment to loads to be lifted. The machinery on the equipment platform 15 as well as an operating station for the operator of the crane is enclosed by a cab 28.

The preferred embodiment of the safe load warning system includes three main components. These components are: a boom angle indicator 29 that senses the boom angle and generates a signal indicative of the magnitude of the boom angle; a load cell 30 that senses the suspension load and a transducer 31 that generates a signal indicative of the magnitude of the suspension load; and a graph board and electrode assembly 32 that receives removable graph boards and that includes an electrode that travels over the graph board in response to the signals of the boom angle indicator 29 and transducer 31.

Figure 2:
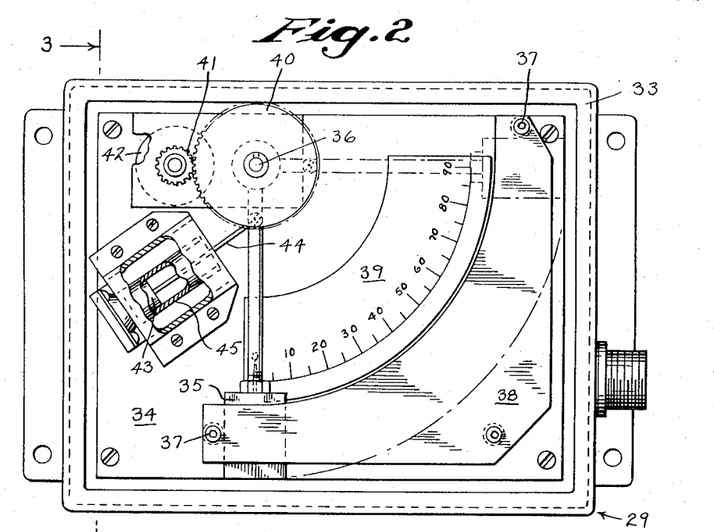
FIG. 2 is a front view in elevation of an apparatus for indicating the boom angle of the hoisting apparatus.
Figure 3:
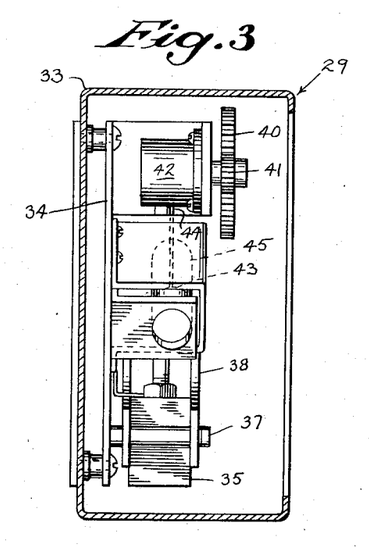
FIG. 3 is a view in vertical section of the boom angle indicator taken in the plane of the line 3—3 of FIG. 2.
Figure 5:
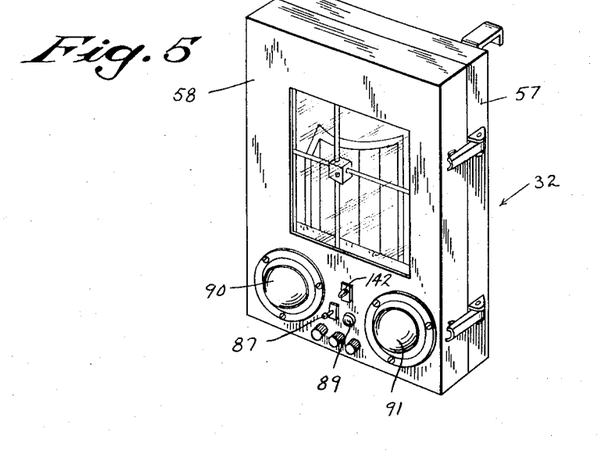
FIG. 5 is a view in perspective of a graph board and electrode assembly forming a part of the system.

Referring to FIGS. 2 and 3, the boom angle indicator 29 includes a housing 33 having a removable cover that has been omitted from the drawings for clarity. A support plate 34 is secured to the bottom of the housing and supports the operating mechanism of the boom angle indicator 29. Such mechanism includes a pendulum 35 mounted for free rotation on a shaft 36 supported on the plate 34. The pendulum 35 is permitted to swing through an arc of 90° from a position shown in full lines in FIG. 2 to a position shown in dotted lines in FIG. 2. The limit of swing of the pendulum 35 is defined by a pair of spaced rods 37 that also support a covering plate 38 to protect the weighted pendulum 35. The plate 39 bearing indicia of the degrees through which the pendulum 35 can swing is for illustrative purposes only since visual reading of the boom angle is not necessary in the system of this invention.

The shaft 36 also mounts a gear 40 that meshes with a pinion 41 mounted on the shaft of a boom angle potentiometer 42. The swinging of the pendulum 35 is dampened by an air damper assembly comprising a piston 43 having its rod 44 connected to the arm of the pendulum 35 and working in a cylinder 45 having a control air escape port.

The boom angle indicator 29 is mounted on the boom 18 as shown in FIG. 1. That is, the boom 18 includes lower side plates and the boom angle indicator 29 is mounted on the interior of the right hand side plate in such manner that when the boom 18 is disposed horizontally the pendulum 35 will be in the position shown in full lines in FIG. 2 and the boom angle will therefore be zero. As the boom 18 is raised to a vertical position, the pendulum 35 will sweep through an arc causing the meshing gear 40 and pinion 41 to rotate the shaft of the boom angle potentiometer to produce a voltage which will be proportional to the boom angle. Thus, the boom angle is measured from the horizontal.

The air damping apparatus of the boom angle indicator 29 prevents shocks on the boom 18 from being reflected in changes in voltage produced by the potentiometer 42 and also guards against overtravel of the pendulum 35 should the boom 18 be raised suddenly.

The load cell 30 is adapted to be responsive to the load in the suspension tackle 20 and thus reflect the suspension load which will include the weight of the boom 18 as well as the load being hoisted on the hook 27. In FIG. 4 there is illustrated schematically a twelve part suspension tackle 20 in which the load cell 30 may operate. Such twelve part tackles are known in the art and the description thereof will, therefore, outline only the fundamentals. Essentially, the lower end of the tackle 20 is supported on the A-frame 22 and the upper end of the tackle 20 connects with the suspension cable 19. An A-frame shaft 46 spans the A-frame 22 and mounts for free rotation a lower vertical sheave 47. The shaft 46 also mounts a carriage 48 on which are rotatably mounted a pair of spaced upper horizontal sheaves 49 and a pair of lower horizontal sheaves 50. The load cell 30 bears at one end against the shaft 46 and at its other end against the blunt end of a cage 51 which extends on either side of the shaft 46 and mounts on its opposite end a vertical sheave 52. The upper works of the suspension tackle 20 include a plate 53 which supports for free rotation three spaced upper horizontal sheaves 54 and three lower horizontal sheaves 55.

The tackle cable is anchored to the carriage 48 and then passes alternately about the lower horizontal sheaves 55 of the plate 53 and the lower horizontal sheaves 50 of the carriage 48 until it passes about the vertical sheave 52 which actuates the load cell 30. From there the cable continues alternately about the upper horizontal sheaves 54 and the upper horizontal sheaves 49 until it passes around the vertical sheave 47 and then is wound about the suspension cable drum 21.

It will be appreciated from FIG. 4 that the vertical sheave 52 receives the sixth and seventh parts of the twelve part tackle 20. It will furthermore be apparent that increases in the load on the boom 18 will be reflected by an increased tension in the cable of the tackle 20 with the result that the cage 51 will bear against the load cell 30 with greater force than at lower loads on the boom 18. That is, the load cell 30 is compressed between the cage 51 and the shaft 46 with increasing force as the boom suspension load increases. Since the load cell 30 is responsive to the increase in load on the sixth and seventh parts of the twelve part tackle 20, which is the midpoint of the tackle, frictional forces produced in raising and lowering the boom 18 will be compensated for and will not affect the accuracy of the suspension load being sensed.

The load cell 30 in the preferred embodiment is a commercially available hydraulic, diaphragm type load cell in which increased compressive force on the ends of the load cell will be reflected in increased hydraulic fluid pressure. This increase in hydraulic fluid pressure is transmitted via a hydraulic line to the transducer 31 disposed in the cab 28 and which converts the changes in hydraulic fluid pressure created in the load cell 30 to changes in electrical potential by way of a load potentiometer 56, the movable tap thereof being moved in response to the changes in the hydraulic fluid pressure.

The voltage signals fed from the transducer 31 and the boom angle indicator 29 function through a control circuit to move an electrode over a graph board. The electrode and graph board together with the electrical control circuit are incorporated in the assembly 32.

Referring to FIGS. 5 through 8, the assembly 32 includes a housing 57 with a hinged cover 58. Within the housing 57 there is mounted a support plate 59 spaced from the bottom of the housing 57 and upon which there is secured a graph plate 60. The graph plate 60 has a central, generally rectangular opening 61 which is adapted to receive a removable graph board 62 which lays against the support plate 59. The graph board 62 is formed of a sheet of dielectric material and has deposited thereon a thin film of electrically conductive material whose borders are defined by curves. The shape of the curves defining such borders and their significance will be described hereafter. Generally, however, there are two electrically conductive curve areas, the limits of which are plotted to an ordinate representing hoisted load and an abscissa representing boom angle. An inner curve area 63 has formed integral therewith a conductor 64 and an outer curve area 65 similarly has a conductor 66 formed integral therewith. The conductors 64 and 66 connect with a releasable contact structure 67 that tightly engages the conductors 64 and 66 when the graph board 62 is inserted in place within the graph plate 60.

An electrode 68 is carried by an electrode holder 69 provided with a pair of bores at right angles to each other and in different planes. Such bores slidably receive a horizontal ordinate rod 70 and a vertical abscissa rod 71. Each of the rods 70 and 71 are supported at both ends by carriers 72 that include a pair of upper wheels 73 and a lower wheel 74. The wheels 73 and 74 engage the top and bottom respectively of the edges of the graph plate 60 which project beyond the support plate 59. The electrode 68 is spring biased in the holder 69 to be in contact with the surface of the graph board 62.

Figure 8:
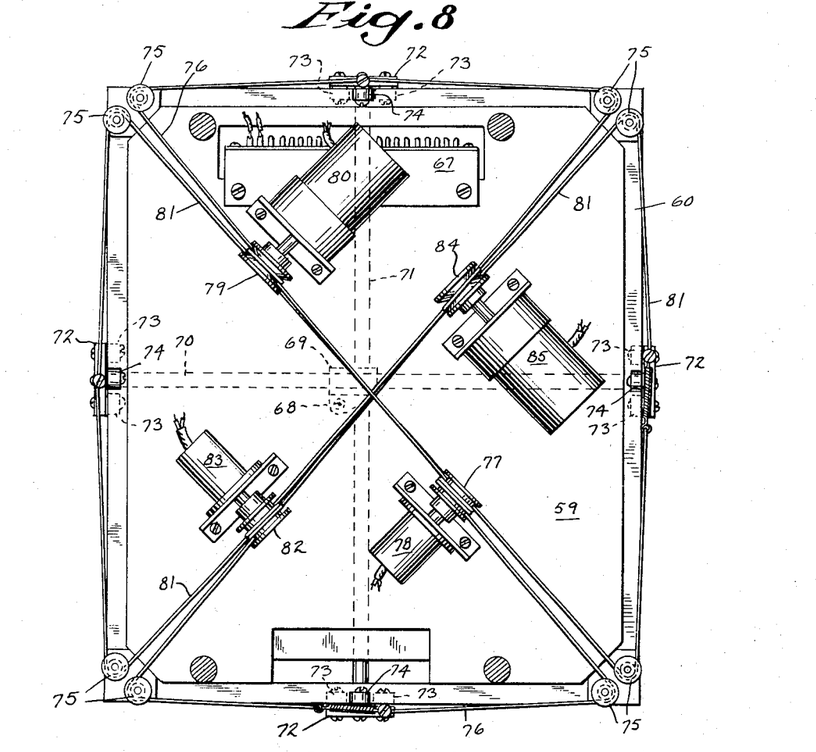
FIG. 8 is a view in vertical section taken in the plane of the line 8—8 of FIG. 7.

Means are provided to move the carriers 72 connected to each of the rods 70 and 71 and consequently to move the electrode holder 69 to positions representing sensed hoisted load and boom angle. Such means includes a servomotor and a cable drive for each of the rods 70 and 71. Specifically, a pair of spaced corner pulleys 75 is provided at each of the four corners of the graph plate 60. As shown in FIG. 8, a first cable 76 is anchored at one end to one of the carriers 72 for the abscissa rod 71 and extends along the bottom of the graph plate 60 to a first corner pulley 75 and thence diagonally across the graph plate 60 to an opposite corner thereof to extend about another corner pulley 75. In its path along the diagonal, the first cable 76 is wound about a pulley 77 on the shaft of a first position potentiometer 78 and also about a pulley 79 on the shaft of a boom angle servomotor 80. The first cable 76 continues across the top of the graph plate 60 to a corner pulley 75 on an opposite corner thereof and the cable 76 is securely held by the upper carrier 72 for the rod 71. The first cable 76 then continues diagonally across the graph plate 60 to an opposite corner and then returns to the first carrier 72 where it is affixed to one end of a tension spring held by such carrier 72.

A second cable 81 is similarly threaded except that it connects to the carriers 72 for the ordinate rod 70 and in tracing a diagonal path beneath the graph plate 60 the second cable 81 is wound on a pulley 82 on the shaft of a second position potentiometer 83 and also about a pulley 84 on the shaft of a hoisted load servomotor 85.

It will be seen that the rotation of the boom angle servomotor 80 will cause the first cable 76 to move the carriers 72 and the abscissa rod 71 horizontally either to the left or right depending upon the direction of rotation of the servomotor 80. Correspondingly, the rotation of the hoisted load servomotor 85 will cause the second cable 81 to move the ordinate rod 70 vertically. Should both the servomotors 80 and 85 be rotated at the same time the path of movement of the holder 69 and thus the electrode 68 will be a combination of vertical and horizontal movements. Control of the duration of rotation of the servomotors 80 and 85 as well as their direction of rotation is governed by the voltage signals representing hoisted load and boom angle and generated by the load cell 30 and boom angle indicator 29, respectively.

Figure 9:
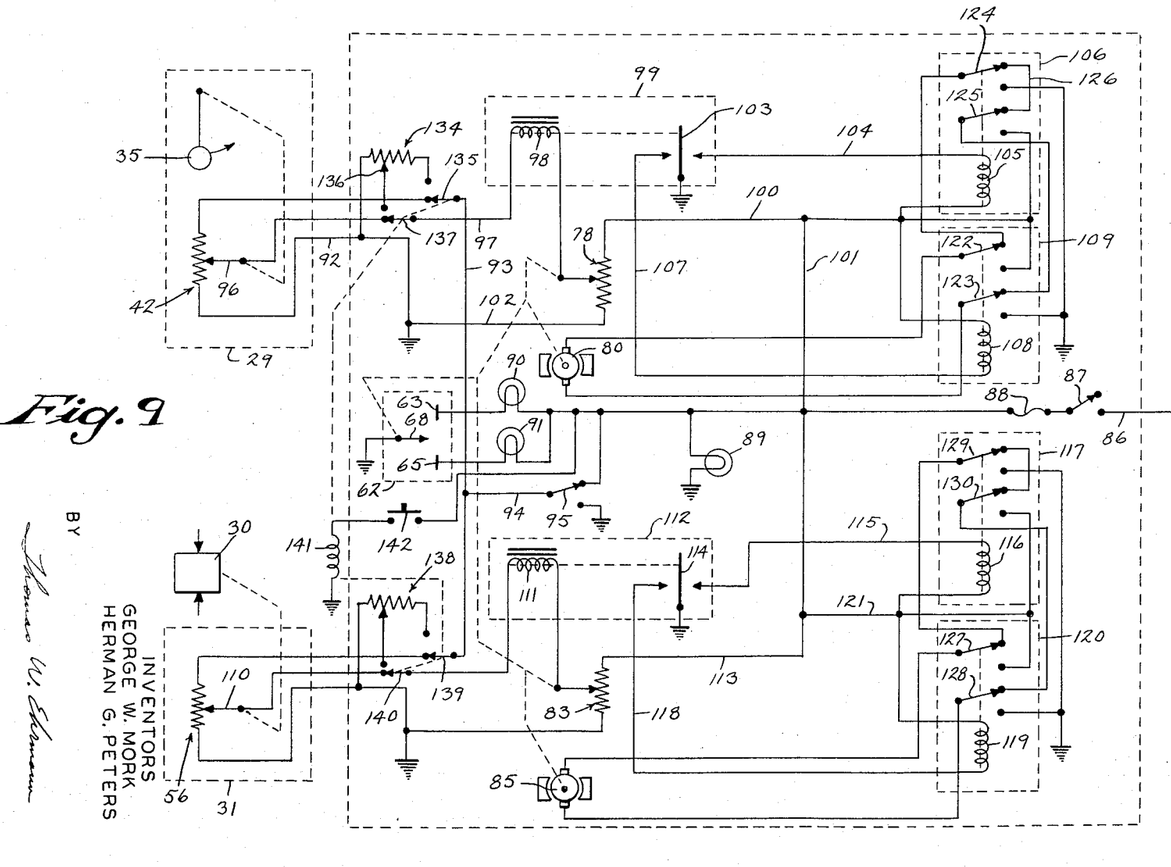
FIG. 9 is a schematic diagram of an electrical control system for the safe load warning system.

Referring to FIG. 9, there is illustrated therein in diagrammatic form a control circuit that responds to the voltage signals of hoisted load and boom angle to drive the servomotors 80 and 85 and also to energize warning signal means. An input conductor 86 is connected to a source of direct current, the lower potential point of which is grounded. The input conductor 86 is interrupted by a power on-off switch 87 and a fuse 88. The on-off switch 87 is mounted on the exterior of the cover 58. A power-on light 89 mounted on the cover 58, and connected across the input conductor 86 and ground, is illuminated whenever the on-off switch 87 is closed to have direct current supplied from the source to the circuit. A pair of warning signals in the form of lights 90 and 91 are also connected between the input conductor 86 and respective ones of the conductive curve areas 63 and 65 deposited on the graph board 62. The light 90 may be provided with an amber lens and is connected with the inner curve area 63 while the light 91 may be provided with a red lens and is connected with the outer curve area 65. The lights 90 and 91 are mounted on the cover 58 so as to be visible to the operator in the cab of the crane.

In FIG. 9, the electrode 68 is illustrated as a switch contact which can assume a neutral position which corresponds to its contact with the dielectric graph board 62 or which can contact either of the curved areas 63 or 65. The electrode 68 is grounded.

The boom angle potentiometer 42 of the boom angle indicator 29 has its resistance element connected at one end to ground through a conductor 92 and its other end connected to a conductor 93 that also leads to one side of the resistance element of the load potentiometer 56. The other end of the resistance element is connected to ground. The conductor 93 is connected by a conductor 94 to one side of a lid switch 95 mounted in an edge of the housing 57 and which assumes a normally open position in which it is connected to ground but which may be depressed by the locking of the cover 58 to complete a circuit from the input conductor 86 to the resistance elements of the boom angle potentiometer 42 and load potentiometer 56. Thus, when the cover 58 is open both sides of such resistance elements are grounded and there is no current flow therethrough.

The movable tap 96 of the boom angle potentiometer 42 is connected by a conductor 97 to one side of a relay coil 98 of a first control micro-relay 99. The other end of the coil 98 is connected to the movable tap of the first position potentiometer 78 whose resistance element is connected by conductors 100 and 101 to the input conductor 86 and by a conductor 102 to ground. A relay switch 103 of the first control relay 99 is connected to ground and can upon actuation by its relay coil 98 make contact with a conductor 104 leading to one side of a relay coil 105 of a first switching relay 106. Alternately, the relay switch 103 can make contact with a conductor 107 leading to a relay coil 108 of a second switching relay 109. The other side of both of the relay coils 105 and 108 is connected to the conductor 100 which in turn connects with the input conductor 86.

A similar arrangement is provided for the resistance elements of the load potentiometer 56 and the second position potentiometer 83. That is, the movable tap 110 of the load potentiometer 56 connects to one side of a relay coil 111 of a second control relay 112 and the other side of the relay coil 111 connects to the movable tap of the second position potentiometer 83. The resistance element of the second position potentiometer 83 is connected across ground and a conductor 113 leading to the input conductor 86. Again, the relay switch 114 of the second control relay 112 is connected to ground and can upon energization of the relay coil 111 make contact with either a conductor 115 connected to a relay coil 116 of a third switching relay 117 or a conductor 118 connected to a relay coil 119 of a fourth switching relay 120. The opposite sides of the relay coils 116 and 119 are connected by a conductor 121 to the conductor 113 which connects with the input conductor 86.

The first and second switching relays 106 and 109 work together as do the third and fourth switching relays 117 and 120. Each of the switching relays has two switch arms. The first and second relay switches 122 and 123 of the second switching relay 109 have their arms connected across the boom angle servomotor 80. In the normal unenergized position of the second relay 109, the first relay switch 122 thereof is connected as shown in FIG. 9 to the arm of a first relay switch 124 of the first switching relay 106 and the second relay switch 123 is connected to the arm of a second relay switch 125 of the first switching relay 106. Furthermore, in the unenergized position of the first switching relay 106 the relay switches 124 and 125 thereof are connected together by a jumper 126 thereby producing a short circuit for the motor 80 when both of the relays 106 and 109 are unenergized. However, should either of the coils 105 or 108 of the first and second switching relays 106 and 109, respectively, be energized, the first relay switch 122 of the second switching relay 109 or the second relay switch 125 of the first switching relay 106 will connect with the conductor 100 leading from the input conductor 86 and the second relay switch 123 or the first relay switch 124 will connect with ground. Thus, since the switching relays 106 and 109 cannot be energized at the same time energization of either one will complete a circuit from the input conductor 86 through the boom angle servomotor 80 to ground and the servomotor 80 will be energized to drive the first cable 76. However, the direction of current flow through the servomotor 80 will be reversed depending upon which of the first or second switching relays 106 and 109 is energized.

The relay switch arrangement for the third and fourth switching relays 117 and 120 is identical to that just described for the first and second switching relays 106 and 109. That is, a first relay switch 127 and a second relay switch 128 of the fourth switching relay 120 have their arms connected across the load servomotor 85 and in their normal position the relay switches 127 and 128 connect to the arms of respective first and second relay switches 129 and 130 of the third switching relay 117. Again, energization of the relay coil 119 of the fourth relay 120 will cause the load servomotor 85 to be connected across the input conductor 86 through the first relay switch 127 and to ground through the second relay switch 128. Alternatively, energization of the coil 116 of the third switching relay 117 will cause the servomotor 85 to be connected across the input conductor 86 through the second relay switch 130 and ground through the first relay switch 129.

To understand the operation of the safe load warning system let us first assume that the electrode 68 has been placed in a position on the graph board 62 representative of the conditions of load and boom angle existing at a given time. Let us further assume that the suspension cable 19 is employed to lower the boom 18. The change in boom angle will be reflected in the boom angle indicator 29 and cause the movable tap 96 of the boom angle potentiometer 42 to change its position on the resistance element and thereby produce a different voltage across the conductors 93 and 97. This voltage will be compared to the voltage across the movable tap of the first position potentiometer 78 which, since it is connected to the boom angle servomotor 80 by the first cable 76, is indicative of the position of the electrode 68 on the graph board 62. Current will flow through the coil 98 of the first control relay 99 in a direction which will be determined by the difference in potential between the potentiometers 42 and 78. The energization of the relay coil 98 by such current flow will cause the relay switch 103 to contact either the conductor 104 or the conductor 107.

If it is assumed that the current flow through the relay coil 98 is such as to cause the relay switch 103 to contact the conductor 104, such movement will complete a circuit from the input conductor 86 through the conductors 101 and 100 to energize the relay coil 105 of the first switching relay 106. This will cause the relay coil 105 to shift the relay switches 124 and 125 to their alternate position whereby a circuit is completed to energize the boom angle servomotor 80. Such circuit leads from the input conductor 86 through conductors 101 and 100, the second relay switch 125 of the first switching relay 106, the second relay switch 123 of the second switching relay 109, the servomotor 80, the first relay switch 122 of the second switching relay 109, and the first relay switch 124 of the first switching relay 106 to ground. The current flow in a given direction through the boom angle servomotor 80 will cause the servomotor 80 to drive the electrode 68 horizontally to the right as viewed in FIG. 6. Since the first position potentiometer 78 is also driven by the boom angle servomotor 80, the tap thereof will move along the resistance element until such time as the voltage produced across the movable tap of the first position potentiometer 78 is equal to that produced across the boom angle potentiometer 42. At such time there will be no current flow through the relay coil 98 of the first control relay 99 so that the relay switch 103 thereof will return to a neutral position permitting the deenergization of the relay coil 105 of the first switching relay 106 with the result that the relay switches 124 and 125 thereof will return to their normal positions in which the boom angle servomotor 80 is short-circuited and the servomotor 80 will stop. Thus, the electrode 68 has been moved to a position representing the new boom angle.

Figure 6:
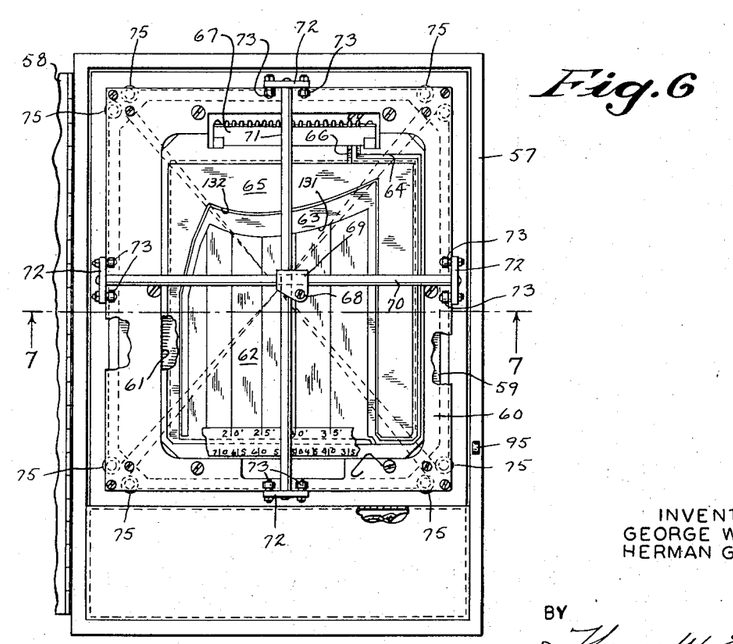
FIG. 6 is a front view in elevation of the assembly of FIG. 5 with a cover thereof opened.
Figure 7:
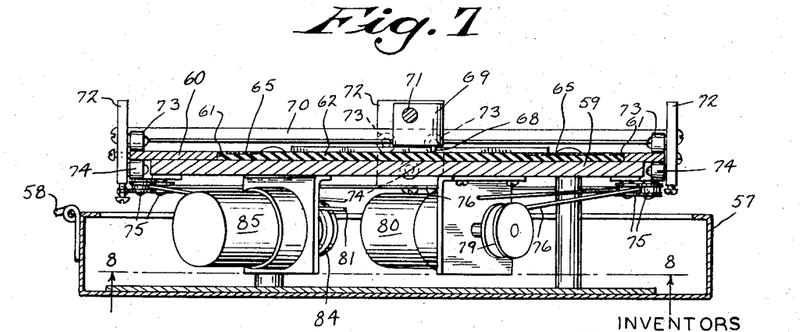
FIG. 7 is a view in horizontal section taken in the plane of the line 7—7 of FIG. 6.

If the boom angle were to have been raised rather than lowered, the difference in potential between the potentiometer 42 and the potentiometer 78 would have caused the second switching relay 109 to become energized and current would have been directed through the boom angle servomotor 80 in an opposite direction causing the electrode 68 to be moved from right to left as viewed in FIG. 6.

The operation of the hoisted load servomotor 85 to move the electrode 68 vertically is carried out in an identical manner.

The boundaries of the conductive curve areas 63 and 65 formed on the graph board 62 represent, generally, a plot of combinations of hoisted load and boom angle which approach an overturning condition of the crane. The ordinate of the graph board, and thus of the curves plotted thereon, represents hoisted load in increasing increments moving from the bottom of the graph board 62 to the top thereof. The abscissa of the graph board 62 represents boom angles in increasing angular increments moving from the right of the board 62 to the left thereof.

It is the leading marginal edges of the curve areas 63 and 65 which are critical. The top leading marginal edges 131 and 132 of the curve areas 63 and 65, respectively, are arrived at by determining, for a particular boom length and for the specific geometry of the crane or other hoisting apparatus to which the system is applied, those combinations of hoisted load and boom angle which will result in a moment that is directly proportional to the moment that tends to overturn the crane about its overturning point 13 (see FIG. 1).

The weight of the boom 18 and the load on the hook 27 will produce a moment about the overturning point 13 which is normally offset by the moment produced by the weight of the crane, less the boom, acting through its center of gravity which falls to the other side of the overturning point 13. However, the crane will overturn when the moment of the weight of the boom 18 and lifted load exceeds the moment of the weight of the crane less the boom. It is this condition which must be guarded against and its approach signalled to the operator of the crane.

The weight of the boom 18 and the load on the hook 27 together with the moment arms of such forces about the overturning point 13 can be related directly to the tension in the suspension cable 19 and in the hoist cable 24 and the moment arms of such forces about the pivot point of the boom foot. This follows from the fact that the tension in the suspension cable 19 is directly proportional to the weight of the boom 18 and the weight on the hook 27 since both of those weights are suspended by the suspension cable 19. Furthermore, the moment arm of the suspension cable 19 about the pivot point of the boom foot can be directly related by the geometry of the particular crane to the boom angle. Additionally, the moment arm of the hoist cable 24 can also be expressed in terms of the boom angle, and the load in the hoist cable 24 is directly proportional to the load on the hook 27. Therefore, for the geometry of a particular type and size of housing unit, the overturning moment can be expressed as a function of only two variables: the hoisted load, or load in the cable 19, and the boom angle.

The curves, then, that form the leading marginal edges 131 and 132 of the curve areas 63 and 65 are plots of values of hoisted load and boom angle which already incorporate the geometry of the unit. They further include compensation for the fact that only one-sixth of the full suspension cable load is being sensed by the load cell 30.

The leading marginal edge 131 of the inner curve area 63 represents a moment which is 75% of that which will cause overturning of the crane and the leading marginal edge 132 of the outer curve area 65 represents a moment which is 85% of the overturning moment. The left and right hand vertical boundaries of the curve area 65 represent the minimum and maximum radii at which the crane can be operated, and the left and right hand boundaries of the curve area 63 are chosen to provide a warning that the operator is approaching minimum or maximum radii.

As the electrode 68 is moved over the graph board 62 no circuit is completed to light the amber light 90 or red light 91. However, as the conditions of boom angle and hoisted load change and the electrode 68 is moved to a position in which it contacts the inner curve area 63, a circuit is then completed from the input conductor 86 through the amber light 90 to ground. The lighting of the amber light warns the operator that the lifting conditions have approached 75% of overturning capacity. If the crane operator continues to aggravate the lifting conditions, the electrode 68 will be caused to move from the curve area 63 into contact with the curve area 65 at which time a circuit is completed through the red light 91 to give a visual warning to the operator that he is beyond 85% of overturning capacity. One of the lights 90 and 91 will, of course, remain lit until the electrode is caused to be moved out of contact with either of the curve areas 63 and 65.

In the embodiment being described, for maximum accuracy each graph board 62 is developed for a particular length of boom. If an additional section of boom is added, or a section is removed, it is necessary to replace the graph board 62 with a similar graph board whose conductive curve areas are correct for the new boom length. This is done by moving the electrode 68 to the extreme upper left hand corner of the graph plate 60 which then exposes completely the graph board 62 and permits its manual removal and replacement by another.

Opening the cover 58 of the assembly 32 will automatically cause the electrode 68 to be moved off of the graph board 62. This follows from the opening of the lid switch 95 which grounds both ends of the resistance elements of the boom angle potentiometer 42 and the load potentiometer 56. The difference in potential between, for example, the first position potentiometer 78 and the boom angle potentiometer 42 will energize the coil 98 of the first control relay 99 thereby causing the relay switch to contact the conductor 107. As previously described, this will cause the servomotor 80 to be energized and the electrode will therefore be moved to the left as viewed in FIG. 6 until it rests on the graph plate 61. Similarly, the relay coil 111 of the second control relay will be energized to ultimately energize the servomotor 85 and thereby move the electrode 68 upwardly until clear of the graph board 62. In such manner the graph board 62 is made accessible for replacement whenever the cover 58 is opened.

Means are also provided to give an artificial voltage signal of hoisted load and boom angle that will cause the servomotors 80 and 85 to move the electrode 68 so that the operator can check the operation of the circuit before lifting a load. Specifically, a first overriding potentiometer 134 has its resistance element connected at one end to the conductor 92 that leads to ground. The other end of the resistance element may be connected to the conductor 93 by a relay switch 135 that interrupts the conductor 93. The movable tap 136 of such potentiometer 134 is connectable to the conductor 97 by a relay switch 137 that interrupts the conductor 97. It will be seen that when the relay switches 135 and 137 are switched to connect the potentiometer 134 with the conductors 93 and 97 such potentiometer 134 will replace the boom angle potentiometer 42 in the circuit.

A similar arrangement is provided for a second overriding potentiometer 138 that can be connected by relay switches 139 and 140 to replace the load potentiometer 56.

Switching of the relay switches 135, 137, 139 and 140 is controlled by a coil 141 that is connected across the input conductor 86 and ground by the closing of a push button 142. Upon energization of the coil 141 by closing of the push button 142, the overriding potentiometers 134 and 138 are compared with the position potentiometers 78 and 83 and they may be set to a level that will produce a voltage differential to cause the circuit to energize the servomotors 80 and 85 to move the electrode 68 both vertically and horizontally. Thus, by depressing the push button 142 and viewing the movement of the electrode 68 it can be determined if the driving circuit is functioning properly.

It has been found advantageous to produce the graph board 62 by laminating copper to one side of a phenolic resin impregnated board. A photosensitive resist is applied to the copper and the resist is exposed through a negative which carries the outlines of the curve areas. Finally the copper is etched from the exposed areas and the remaining copper curve areas are plated with a suitable durable conductive coating. This method of forming the graph boards 62 permits the accurate plotting of the marginal edges of the curve areas on a large scale and a subsequent photographic reduction of the drawing to the size of the negative.

The boom angle signal generating means and the hoisted load signal generating means can take forms other than those illustrated and described. For example, the load cell 30 and transducer 31 could be replaced by a piezoelectric transducer. Similarly, the warning signal means can take the form of buzzers, sirens, flashing lights, or operate a brake on the hoisting equipment in addition to or in place of the distinguishable colored lights that have been shown.

The system of this invention provides an accurate and reliable means of alerting the operator of a hoisting apparatus of impending dangerous conditions. It will also function to give the operator an indication of the degree to which the hoisting apparatus is approaching overturning. The graph boards are interchangeable between all pieces of hoisting equipment having the same geometry, and the system as a whole can be applied to all types of boom equipped hoisting apparatus.

We claim:

1. A safe load warning system for boom equipped hoisting apparatus, comprising: a graph board having a curve formed thereon and plotted to coordinates representing the load hoisted by said apparatus and the angular position of said boom, one of said graph board and curve being formed of a dielectric material and the other being formed of an electrically conductive material, said curve representing combinations of hoisted load and boom angle that yield a moment tending to overturn said hoisting apparatus; electrode means adapted to traverse said graph board; warning signal means adapted to be actuated by movement of said electrode into contact with said curve; and means for moving said electrode on said graph board to positions corresponding to the hoisted load and boom angle.

2. A safe load warning system for boom equipped hoisting apparatus, comprising: a dielectric graph board having an electrically conductive curve described thereon, said curve being plotted to coordinates representing the load hoisted by said apparatus and the angular position of said boom, and said curve representing combinations of hoisted load and boom angle that yield a moment that tends to overturn said hoisting apparatus; electrode means adapted to traverse said graph board; warning signal means adapted to be actuated by contact of said electrode means with said curve; and means for moving said electrode means on said graph board to positions corresponding to the hoisted load and boom angle.

3. A safe load warning system for boom equipped hoisting apparatus, comprising: a dielectric graph board; an electrically conductive curve plotted on said graph board to coordinates representing the load hoisted by said apparatus and the angular position of said boom, said curve describing for the geometry of the hoisting apparatus the combinations of hoisted load and boom angle that produce a moment that tends to overturn the hoisting apparatus; electrode means adapted to traverse said graph board; warning signal means; a normally open electric circuit connecting said signalling means to a source of electric current and including said curve and said electrode means, said circuit being closed to energize said signalling means by contact of said electrode means with said curve; and means for positioning said electrode means on said graph board at positions corresponding to the hoisted load and boom angle and for varying such position in accordance with changes in hoisted load and boom angle.

4. A safe load warning system for boom equipped hoisting apparatus, comprising: a dielectric graph board; a pair of spaced electrically conductive curves plotted on said graph board to coordinates representing the load hoisted by said apparatus and the angular position of said boom, a first of said curves representing combinations of hoisted load and boom angle that yield a moment that is a given percentage of the moment that will overturn said hoisting apparatus and the second of said curves representing combinations of hoisted load and boom angle that yield a moment that is a greater percentage of said overturning moment; electrode means adapted to traverse said graph board; a pair of electrically energizable warning signal means that produce recognizably different warning signals; circuit means adapted to energize one of said signalling means when said electrode means contacts said first curve and adapted to energize the other of said signalling means when said electrode means contacts said second curve; and means for positioning said electrode means on said graph board at positions corresponding to the hoisted load and boom angle and for varying such position in accordance with changes in hoisted load and boom angle.

5. A safe load warning system for boom equipped hoisting apparatus, comprising: means responsive to the angular position of the boom and adapted to generate a signal indicative of the boom angle; means responsive to the load hoisted by said apparatus and adapted to generate a signal indicative of said hoisted load; a dielectric graph board having an electrically conductive curve described thereon, the coordinates of such curve representing hoisted load and boom angle and said curve representing combinations of hoisted load and boom angle which approach an overturning condition for said hoisting apparatus; an electrode adapted to traverse said graph board; means responsive to said signals to move electrode over said graph board; and warning signal means adapted to be actuated by contact of said electrode with said curve.

6. A safe load warning system for hoisting apparatus that includes a boom pivotally mounted at its lower end to a machinery platform, a suspension cable connected to said boom for supporting the boom at a selected angular position, and a hoist cable working on said boom to hoist a load, said warning system comprising: first signal generating means responsive to the angular position of the boom and adapted to generate a signal proportional to the boom angle; second signal generating means responsive to the load on said suspension cable and adapted to generate a signal proportional to the suspension load; a dielectric graph board; an electrically conductive curve on said graph board that is plotted to coordinates representing said suspension load and said boom angle, said curve representing combinations of suspension load and boom angle which for the geometry of the hoisting apparatus yields a moment proportional to the moment that will overturn the hoisting apparatus; an electrode adapted to traverse said graph board; means responsive to said signals to move said electrode over said graph board; and warning signal means adapted to be actuated by contact of said electrode with said curve.

7. A safe load warning system in accordance with claim 6 wherein said suspension cable includes a plural part suspension tackle having an even number of parts, and said second signal generating means is responsive to the load on said tackle at the midpoint of said tackle so that frictional forces arising from raising and lowering said boom do not affect the accuracy of the generated signal.

8. A safe load warning system in accordance with claim 7 wherein the middle parts of said tackle are strung above a sheave that is mounted on a movable cage, and said second signal generating means is biased between said cage and a fixed support to be compressed with increasing force under increasing tension in said tackle.

9. A safe load warning system for boom equipped hoisting apparatus, comprising: first signal generating means responsive to the angular position of the boom and adapted to generate a signal proportional to the boom angle; second signal generating means responsive to the load hoisted by said apparatus and adapted to generate a signal proportional to the hoisted load; a dielectric graph board; an electrically conductive curve described on said graph board and having an ordinate that represents said hoisted load and an abscissa that represents said boom angle, said curve representing a moment produced by combinations of said hoisted load and boom angle directly proportional to the moment that will overturn the hoisting apparatus; an electrode adapted to traverse said graph board; normally open circuit means connecting said electrode and said curve to a source of electric current; and warning signal means adapted to be energized by the closing of said circuit means by contact of said electrode with said curve.

10. A safe load warning system in accordance with claim 9 wherein the moment represented by said curve is a given percentage of the moment that will overturn said hoisting apparatus; a second electrically conductive curve is described on said graph board that represents a moment produced by combinations of said hoisted load and boom angle that is a greater percentage of said overturning moment; and a second warning signal means is adapted to be energized by the closing of said circuit means by contact of said electrode with said second curve, said warning signal means producing recognizably different warning signals.

11. A safe load warning system in accordance with claim 10 wherein the first and second curves define leading marginal edges of respective first and second spaced electrically conductive areas deposited on said graph board so that the first warning signal means will be energized until said electrode contacts said second area and one or the other of said warning signal means will be energized until said electrode contacts said dielectric graph board.

12. A safe load warning system for boom equipped hoisting apparatus, comprising: first signal generating means responsive to the angular position of the boom and adapted to generate an electrical signal proportional to the boom angle; second signal generating means responsive to the load hoisted by said apparatus and adapted to generate an electrical signal proportional to the hoisted load; a dielectric graph board; an electrically conductive curve described on said graph board and having an ordinate that represents said hoisted load and an abscissa that represents said boom angle, said curve representing for the geometry of said hoisting apparatus a moment produced by combinations of said hoisted load and boom angle that is directly proportional to the moment that will overturn the hoisting apparatus, an electrode adapted to traverse said graph board; a first motor connected to move said electrode in the direction of said ordinate; a second motor connected to move said electrode in the direction of said abscissa; driving circuit means connecting said signal generating means and said motors to a source of electric current to drive said motors in response to changes in said electrical signals; position indicating means responsive to the position of said electrode on said graph board to stop the driving of said motors when said electrode is at a position on said graph board coinciding with the hoisted load and boom angle represented by said electrical signals; and warning signal means adapted to be actuated by the contact of said electrode with said curve.

13. A safe load warning system for boom equipped hoisting apparatus, comprising: signal generating means responsive to the angular position of the boom and adapted to create a voltage signal proportional to the boom angle; signal generating means responsive to the load hoisted by said apparatus and adapted to create a voltage signal proportional to the hoisted load; an enclosure; a dielectric graph board removably inserted in said enclosure; an electrically conductive curve formed on said graph board, said curve being plotted to an ordinate representing hoisted load and an abscissa representing boom angle, and said curve representing combinations of hoisted load and boom angle which for the geometry of the hoisting apparatus including the length of the boom produce a moment that is proportional to a moment that will overturn the apparatus; driving means connected to said signal generating means and adapted to move said electrode in response to said voltage signals; an electrode mounted in said enclosure for movement over said graph board; position responsive means adapted to produce voltages proportional to the position of said electrode on said graph board to halt movement of said electrode when the voltages produced by said position responsive means balance said voltage signals; electrically actuatable warning signal means; and an electric circuit connecting said signal means to a source of current to energize said signal means when said electrode contacts said curve.

14. A safe load warning system in accordance with claim 13 together with means for producing artificial voltage signals proportional to boom angle and hoisted load, and switching means including a push button mounted on said enclosure and adapted to disconnect said signal generating means from said driving means to have said driving means move said electrode over said graph board in response to said artificial voltage signals upon actuation of said push button whereby the operation of said driving means can be tested before a load is lifted by the hoisting apparatus.

15. A safe load warning system for hoisting apparatus that includes a boom pivotally mounted to a machinery platform, a suspension cable including a plural part suspension tackle for supporting said boom at a selected angular position, a hoist cable working on said boom to hoist a load, and an operator cab on the machinery platform, said warning system comprising: a boom angle indicator mounted on said boom and responsive to the angular position of said boom to produce an electrical signal proportional to the boom angle; a load indicator responsive to the load on said tackle at the midpoint thereof to produce an electrical signal proportional to the suspension load; an enclosure mounted in said cab; a graph board removably inserted in said enclosure and having a dielectric surface; spaced first and second electrically conductive areas formed on said surface of said graph board and each having a transitional marginal edge defined by a curve that is plotted to an ordinate representing suspension load and an abscissa representing boom angle, said curve of said first area representing for the geometry of the hoisting apparatus including the length of said boom a moment that is a given percentage of the moment that will overturn the hoisting apparatus and said curve of said second area representing such a moment that is a greater percentage of said overturning moment; an electrode mounted in said enclosure; means responsive to said electrical signals to move said electrode over said graph board; first and second distinguishable visual warning signal means mounted on said enclosure; and normally open circuit means connecting said visual signal means to a source of electric current, said circuit means being closed by contact of said electrode with said conductive areas to energize a respective one of said visual signal means.

16. A safe load warning system for hoisting apparatus including a boom having its foot pivotally mounted on a machinery platform, a suspension cable for supporting said boom at a selected angular position, and a hoist cable working on said boom to hoist a load, said warning system comprising: means responsive to the angular position of the boom and adapted to generate a signal proportional to the boom angle; means responsive to the load on said suspension cable and adapted to generate a signal proportional to the suspension load; a dielectric graph board; an electrically conductive curve on said graph board that is plotted to coordinates representing said suspension load and said boom angle, said curve representing the moment of said suspension load and the load on said hoist cable about the pivot point of the boom foot, which moment is directly proportional to the moment that will overturn the hoisting apparatus and which is expressed as a function of said suspension load and said boom angle; an electrode adapted to traverse said graph board; means responsive to said signals to move said electrode over said graph board; and warning signal means adapted to be actuated by contact of said electrode with said curve.

References Cited
UNITED STATES PATENTS

| | | | |
|---|---|---|---|
| 2,030,529 | 2/1936 | Nash | 212—39 X |
| 2,418,576 | 4/1947 | Conrad | 340—267 |
| 2,858,070 | 10/1958 | Scharff | 340—267 |

THOMAS B. HABECKER, *Acting Primary Examiner.*

D. L. TRAFTON, *Assistant Examiner.*

UNITED STATES PATENT OFFICE
CERTIFICATE OF CORRECTION

Patent No. 3,362,022                      January 2, 1968

George W. Mork et al.

It is hereby certified that error appears in the above numbered patent requiring correction and that the said Letters Patent should read as corrected below.

Column 8, line 69, for "housing unit" read -- hoisting unit --; column 12, line 14, for "strung above" read -- strung about --.

Signed and sealed this 28th day of January 1969.

(SEAL)
Attest:

Edward M. Fletcher, Jr.                    EDWARD J. BRENNER Attesting Officer                          Commissioner of Patents